United States Patent [19]

Mao

[11] Patent Number: 4,641,520
[45] Date of Patent: Feb. 10, 1987

[54] SHEAR WAVE TRANSDUCER FOR STRESS MEASUREMENTS IN BOREHOLES

[75] Inventor: Nai-Hsien Mao, Castro Valley, Calif.

[73] Assignee: The United States of America as represented by the United States Department of Energy, Washington, D.C.

[21] Appl. No.: 643,348

[22] Filed: Aug. 23, 1984

[51] Int. Cl.⁴ .......................... G01V 1/40; E21B 49/00
[52] U.S. Cl. ........................................ 73/151; 73/152; 73/597; 73/784; 367/25; 367/75
[58] Field of Search ................ 73/151, 152, 597, 784; 367/25, 27, 75, 31, 911; 181/102, 104, 106, 108

[56] References Cited

U.S. PATENT DOCUMENTS

| | | | |
|---|---|---|---|
| 3,354,983 | 11/1967 | Erickson et al. | 367/75 X |
| 3,580,057 | 5/1971 | Seegmiller | 73/597 |
| 3,796,091 | 3/1974 | Serata | 73/784 |
| 4,030,345 | 6/1977 | Edmond et al. | 73/784 |
| 4,075,885 | 2/1978 | Hardy et al. | 73/784 |
| 4,080,836 | 3/1978 | Thompson et al. | 73/597 |
| 4,346,460 | 8/1982 | Schuster | 367/27 |
| 4,363,242 | 12/1982 | Heyman | 73/597 X |
| 4,380,806 | 4/1983 | Waters et al. | 367/27 |
| 4,522,071 | 6/1985 | Thompson | 73/597 |

FOREIGN PATENT DOCUMENTS 0681401 8/1979 U.S.S.R. ............................ 181/102

Primary Examiner—Stephen A. Kreitman
Assistant Examiner—Scott M. Oldham
Attorney, Agent, or Firm—Henry P. Sartorio; L. E. Carnahan; Judson R. Hightower

[57] ABSTRACT

A technique and apparatus for estimating *in situ* stresses by measuring stress-induced velocity anisotropy around a borehole. Two sets each of radially and tangentially polarized transducers are placed inside the hole with displacement directions either parallel or perpendicular to the principal stress directions. With this configuration, relative travel times are measured by both a pulsed phase-locked loop technique and a cross correlation of digitized waveforms. The biaxial velocity data is used to back-calculate the applied stress.

8 Claims, 5 Drawing Figures

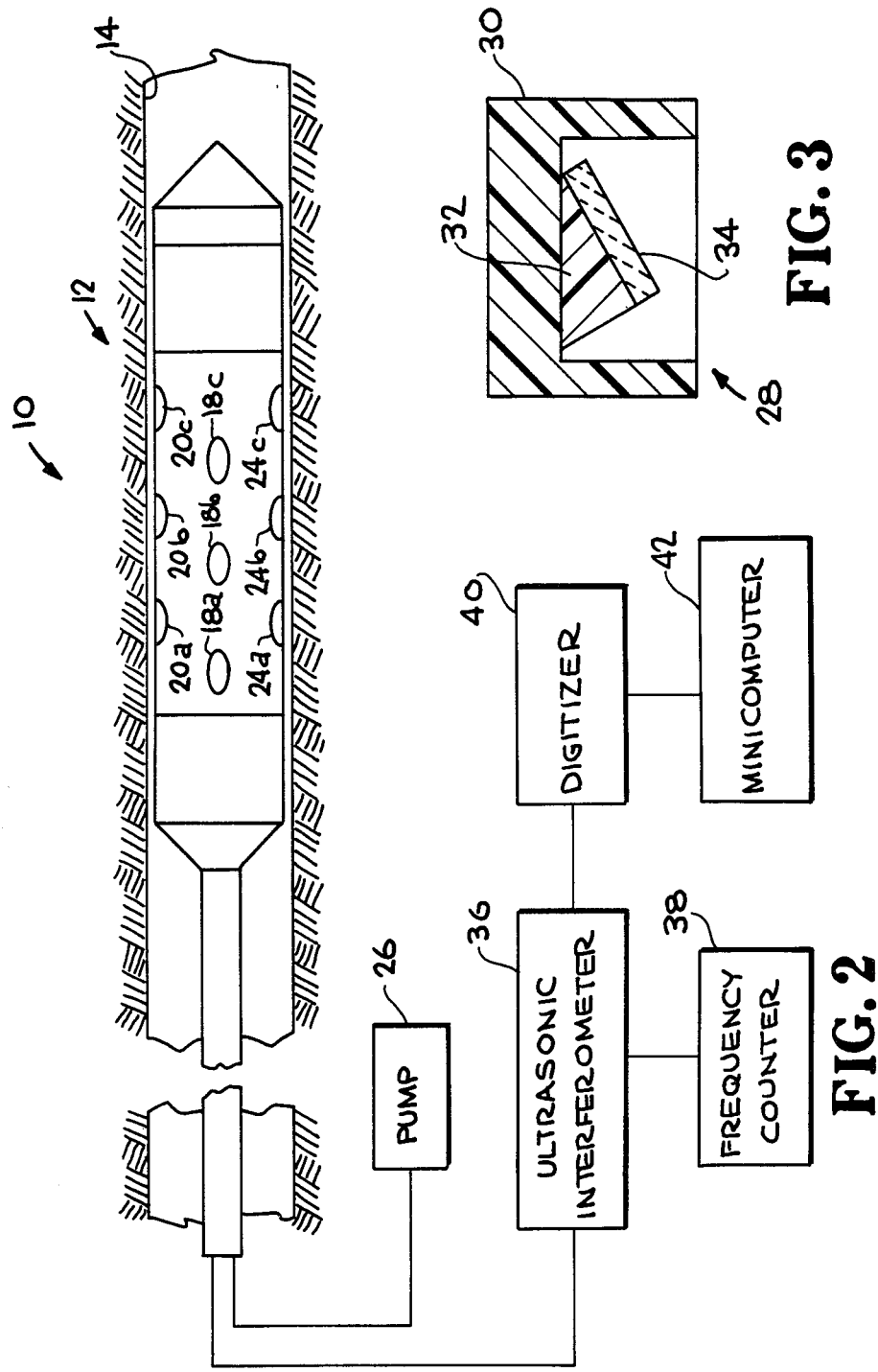

SHEAR WAVE TRANSDUCER FOR STRESS MEASUREMENTS IN BOREHOLES

BACKGROUND OF THE INVENTION

The U.S. Government has rights in this invention pursuant to Contract No. W-7405-ENG-48 between the U.S. Department of Energy and the University of California, for the operation of Lawrence Livermore National Laboratory.

The invention relates to in situ stress measurement and, more particularly, to in situ acoustic measurements.

In a variety of applications it is desirable to measure the in situ stress field from a borehole. A variety of techniques for determining in situ stress in a rock mass have been developed; generally, the stress state is deduced from an observable effect of stress change such as elastic wave velocities, resistivity, strain, or fluid pressure necessary to hold open a fracture. The complexity of the relationship between stress and the observed effect makes the development of a reliable technique difficult. Since every element is simultaneously subjected to a number of different stresses, the measured stress is the cumulative effect from all the sources which may vary from point to point. No single measurement technique is good for all cases.

The measurement of stress in deep boreholes is particularly difficult. The only technique for in situ stress measurements at great depths in a borehole is by hydraulic fracturing. However, hydraulic fracturing is the same technique used to produce mass fractures for the purpose of gas stimulation. Accordingly, it is desirable to have another technique available so that prior knowledge of stress orientation and magnitude can be determined before hydraulic fracturing is performed. In addition, the operation of hydraulic fracturing is very time consuming and costly, so an alternative or complementary measurement technique is desired.

It is known that the velocity of propagation of ultrasonic waves is stress dependent. The velocity of a compressional wave is strongly affected by stress if the stress direction is parallel to the propagation direction. The velocity of shear waves is strongly affected by stress if the direction of applied stress is parallel to the polarization direction. In particular, the shear wave will, in general, be resolved into two components with orthogonal polarization vectors and different velocities if the material is stressed. This phenomenon is called acoustic double refraction or acoustic birefringence.

Accordingly, it is an object of the invention to provide a method and apparatus for in situ stress measurement in a borehole.

It is also an object of the invention to provide an acoustic method and apparatus for in situ stress measurement in a borehole.

It is a further object of the invention to provide a method and apparatus for in situ stress measurement in a deep borehole.

SUMMARY OF THE INVENTION

The invention is an acoustic method and apparatus for estimating in situ stresses by measuring stress-induced shear wave velocity anisotropy around a borehole. An array of transducers is utilized to generate and detect radially and tangentially polarized shear waves in a borehole configuration. A transducer wedge assembly is utilized to generate refracted waves. Four sets of wedge transducers, each set having a transmitting transducer and at least one receiving transducer, two sets radially polarized and two sets tangentially polarized, are placed inside a borehole with displacement directions either parallel or perpendicular to the principal stress directions. Relative travel times are measured by both a pulsed phase locked loop technique and by a cross-correlation of digitized waveforms.

The invention utilizes an acousto-elastic technique to measure the in situ stress field from a borehole. The invention utilizes four sets of transducers to measure the four combinations of tangential stress and radial stress parallel to and normal to the displacement direction.

Around the borehole shear waves are either tangentially or radially polarized and the horizontal principal stresses are also in the tangential and radial directions. Consequently, wave velocities are complex functions. Velocity is not measured directly; only travel time is measured. It is very difficult to measure absolute travel time with a high precision in rocks. However, the relative arrival time can be measured very precisely by methods including a pulsed phase locked loop approach and a pure mode whole waveform approach. These two metnods are complementary and can be utilized at the same time. One receiver is sufficient with each transmitter although tne addition of a second receiver makes the timing measurement more accurate and this is preferred.

The wedge configuration places the transmitting and receiving transducers on the same face. Wedges are made of plexiglass because of its low acoustic loss and low velocities. The shear wave transducers are mounted in an inflatible urethane bladder. The four sets of transducers are mounted in the bladder 90 degrees apart from each other, with the transducers extending through openings in the bladder so they can be pushed into contact with the borehole wall. The bladder keeps the transducers well aligned and separated by a fixed distance.

A pulsed phase-locked loop technique is used to measure stress effect and travel time. An ultrasonic tone burst of a specific frequency derived from a gated voltage controlled oscillator (VCO) is applied to the transmitting transducer. The generated acoustic wave propagates along the borehole and is converted to an electrical pulse by the receiving transducer. The electrical single is amplified and its carrier removed. The resulting signal is a voltage pulse of duration equal to the gate signal width and of amplitude determined by the phase relationship between the oscillator and the received ultrasonic pulsed signal. The voltage pulse is sampled and stored. The sample voltage properly filtered controls the voltage of the VCO thus closing the pulsed phase-locked feedback loop. The system operates in phase quadrature maintaining a constant phase relationship between the direct electrical signal and the acoustically phase shifted signal. The frequency required to maintain this in phase condition is monitored. Because frequency can be measured precisely the technique is extremely sensitive. It is most useful in measuring the velocity change due to stress.

The pure-mode waveform is digitized for later timing analysis. The received signal is sent through a programmable digitizer and recorded on a computer LSI-11, e.g. in digital form for timing analysis so the changes in both frequency and length can be determined from which velocity change can be calculated. The transducers are arranged so that the displacement direction is always either parallel or perpendicular to the principal stress guaranteeing that pure modes will be generated under stress. Pulse timing is utilized to determine the time difference of the same pure mode at different stress levels and/or different orientations. Spectral and cross-correlation methods are used to analyze the digitized data for timing.

BRIEF DESCRIPTION OF THE DRAWINGS

FIG. 2 is a prospective view of an ultrasonic borehole stressmeter for measuring shear wave velocity anisotropy around a borehole.

FIG. 3 is a cross-sectional view of a transducer.

DETAILED DESCRIPTION OF A PREFERRED EMBODIMENT

The invention measures stress induced shear wave velocity anisotropy which is then utilized to determine the stress field around the borehole. The velocity measurement technique is a domain measurement along the acoustic path rather than a local measurement which can be influenced by a nearby abnormality. The separation of the transmitter and receiver(s) is adjusted for the size of a geological unit so that average values are obtained for a homogeneous section. Basic assumptions of the technique are (1) the borehole is a straight, vertical circular hole parallel to the vertical stress; (2) the vertical stress can be estimated from overburden; and (3) the medium along the acoustic path is homogeneous. The invention provides the generation and detection of various wave propagation modes in a borehole configuration. The timing of the relative travel time for different modes or the same mode under different stress conditions provides output data.

Figure 1:
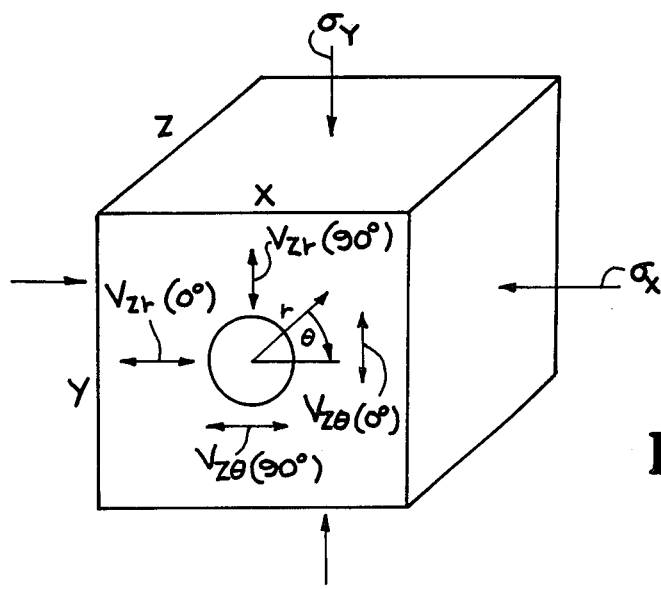
FIG. 1 is a diagram of the coordinate system around a borehole (shown in a horizontal position) and the shear wave velocity components.

The invention utilizes the relationship between stresses around a borehole. For a circular hole with the long axis in the vertical direction in an isotropic material, the radial $\sigma_r$ and tangential $\sigma_\theta$ stresses can be expressed as functions of the principal stresses:

$$\sigma_r = \frac{\sigma_1 + \sigma_2}{2}\left[1 - \left(\frac{a}{r}\right)^2\right] + \frac{\sigma_1 - \sigma_2}{2}\left[1 + 3\left(\frac{a}{r}\right)^4 - 4\left(\frac{a}{r}\right)^2\right]\cos 2\theta, \quad (1)$$

$$\sigma_\theta = \frac{\sigma_1 + \sigma_2}{2}\left[1 + \left(\frac{a}{r}\right)^2\right] - \frac{\sigma_1 - \sigma_2}{2}\left[1 + 3\left(\frac{a}{r}\right)^4\right]\cos 2\theta, \quad (2)$$

where $\sigma_1$ and $\sigma_2$ are the two principal stresses in the horizontal plane, a is the radius of the hole, and $\theta$ is the angle counterclockwise from the $\sigma_1$-direction. The coordinate system around a borehole is illustrated in FIG. 1 (shown in a horizontal position).

The magnitudes of $\sigma_r$ and $\sigma_\theta$ are functions of azimuth $\theta$ and radius r. Although stress orientations near the hole are strongly influenced by the hole, texture anisotropy is not. Textural anisotropy can have a profound effect on the velocities and must be taken into consideration in the interpretation of velocity data around a borehole. On the other hand, stress concentration due to the presence of the hole enhances stress-induced velocity anisotropy and makes the velocity approach easier than that for the case without a hole.

The invention utilizes the stress effect on sound wave velocities. Under triaxial loading, for sound waves propagating in the principal stress x direction, $\sigma_x \neq \sigma_y \neq \sigma_z \neq 0$ in general. The total stress effect on velocity is the linear combination of the stress effect due to all components loaded individually. The linear equations for the velocities in the principal stress directions are:

$$V_{xx}^2 = V_{xx0}^2 + A_{xx}\sigma_x + B_{xx}\sigma_y + C_{xx}\sigma_z,$$

$$V_{xy}^2 = V_{xy0}^2 + A_{xy}\sigma_x + B_{xy}\sigma_y + C_{xy}\sigma_z,$$

$$V_{xz}^2 = V_{xz0}^2 + A_{xz}\sigma_x + B_{xz}\sigma_y + C_{xz}\sigma_z, \quad (3)$$

where $V_{ij}$ is the velocity of a body wave propagating in the i-direction with particle motion in the j-direction and $V_{ij0}$ is the stress-free velocity. $A_{ij}$, $B_{ij}$, and $C_{ij}$ are the velocity-stress coupling coefficients for the principal stresses in the x-, y-, and z-directions. For isotropic solids, $A_{xy}=A_{xz}$, $B_{xx}=C_{xx}$, $B_{xy}=C_{xz}$, and $B_{xz}=C_{xy}$.

Combining the two shear waves for an isotropic solid, $$\sigma_z - \sigma_y = \frac{1}{(B_{xy} - B_{xz})}(\Delta V_{xz}^2 - \Delta V_{xy}^2) \quad (4)$$

where $\Delta V_{ij}^2 = V_{ij}^2 - V_{ij0}^2$

Therefore, the difference between the two shear wave velocities is proportional to the stress difference in the two directions of particle motion.

If a homogeneous solid block is stressed, the stress-induced velocity anisotropy will produce shear wave splitting, with shear wave velocity as a function of direction only. This is not true around a borehole, where the horizontal principal stresses are in the tangential and radial directions. Furthermore, both $\sigma_\theta$ and $\sigma_r$ are functions of $\sigma$ and r. Consequently, wave velocities also are functions of both $\theta$ and r.

For elastic waves traveling in the z-direction along the axis of the borehole, the body wave velocities are $V_{zz}$, $V_{zr}$, and $V_{z\theta}$ for the compressional wave, the radially polarized shear wave, and the tangentially polarized shear wave, respectively. According to the invention it is necessary to measure the differences between two $V_{zr}$ and $V_{z\theta}$ at different $\theta$ and between two $V_{zr}$ or two $V_{z\theta}$ at different stresses; these velocity components are shown in FIG. 1. Under biaxial loading, the stress effect on velocity is the following:

$$V_{z\theta}^2 - V_{z\theta 0}^2 = A\left(\sigma_\theta + \frac{B}{A}\sigma_r\right) = \bar{A}\sigma_\theta, \quad (5a)$$

$$V_{zr}^2 - V_{zr0}^2 = A\left(\sigma_r + \frac{B}{A}\sigma_\theta\right) = A\bar{\sigma}_r \quad (5b)$$

where A and B, respectively, are the velocity-stress coupling coefficients—along and perpendicular to the particle motion direction. Here, $\bar{\sigma}_\theta$ and $\bar{\sigma}_r$ are the "total stresses", seen by the shear waves, of displacement directions parallel to tangential and radial stresses, respectively. The above relations are functions of $\theta$. For measured values at $\theta = 0°$ and $90°$, $$(\sigma_x - \sigma_y) = \frac{1}{4A\left(1 + \frac{B}{A}\frac{a^2}{r^2}\right)} \{[\Delta V_{z\theta}^2(90°) - \Delta V_{z\theta}^2(0°)] + \quad (6)$$

$$[\Delta V_{zr}^2(90°) - \Delta V_{zr}^2(0°)]\},$$

In the case $r = a$, the radius of the borehole, if the material properties A and B, are known and the differences in velocities of both tangentially and radially polarized shear waves at $\theta = 0°$ and $90°$ are measured, the stress difference can be calculated. There are two advantages of Eq. (6) over Eq. (4). First, Eq. (4) deals with orthogonally polarized waves, which often have different waveforms; consequently, they are difficult to compare. On the other hand, Eq. (6) deals with the difference between the same modes of a similar waveform; thus, it is easier to measure the travel time difference. Secondly, the velocity part of Eq. (6) may be written in a form to eliminate the initial velocity anisotropy:

$$[\Delta V_{z\theta}^2(90°) - \Delta V_{z\theta}^2(0°)] + [\Delta V_{zr}^2(90°) - \Delta V_{zr}^2(0°)] =$$

$$\{[V_{z\theta}^2(90°) - V_{z\theta}^2(0°)] + [V_{zr}^2(90°) - V_{zr}^2(0°)]\} +$$

$$\{[V_{zr0}^2(90°) - V_{z\theta0}^2(0°)] + [V_{z\theta0}^2(90°) - V_{zr0}^2(0°)]\}$$

The term with unstressed velocities $V_{ij0}$ is zero for homogeneous anisotropic material; thus, only the four velocities $V_{z\theta}(90°)$, $V_{z\theta}(0°)$, $V_{zr}(90°)$, $V_{zr}(0°)$ are measured. Eq. (4) has to be modified with additional terms when applied to initially anisotropic material.

According to the invention, instead of measuring velocity directly, only travel time is measured. The above relations are also applicable by replacing $V_{ij}$ with $t_{ij}$ and A with A', etc. wherein the prime indicates the material properties transposed from velocity to time units. For instance, Eq. (6) becomes $$(\sigma_x - \sigma_y) = \frac{1}{4A'\left(1 + \frac{B'}{A'}\frac{a^2}{r^2}\right)} \{[\Delta t_{z\theta}^2(90°) - \Delta t_{z\theta}(0°)] + \quad (7)$$

$$[\Delta t_{zr}(90°) - \Delta t_{zr}(0°)]\}.$$

Furthermore, if the travel time difference between the initial and final stress conditions is measured when $r = a$ and $\sigma_r = 0$, then $\sigma_\theta(0°) = -\sigma_x + 3\sigma_y$,
$\sigma_\theta(90°) = 3\sigma_x + \sigma_y$.
Hence, $$\sigma_x = \frac{1}{8(A' \pm B')}\{[\Delta t_{z\theta}(0°) \pm \Delta t_{zr}(0°)] + \quad (8)$$

$$[3\Delta t_{z\theta}(90°) \pm \Delta t_{zr}(90°)]\}$$

and $$\sigma_y = \frac{1}{8(A' \pm B')}\{[3\Delta t_{z\theta}(0°) \pm \Delta t_{zr}(0°)] + \quad (9)$$

$$[\Delta t_{z\theta}(90°) \pm \Delta t_{zr}(90°)]\}$$

Thus, both $\sigma_x$ and $\sigma_y$ can be calculated.

According to the invention, two methods are used for measuring stress induced velocity anisotropy, a pulsed phase-locked loop ($P^2L^2$) approach and the "pure mode" whole waveform (PMWW) approach. These two methods complement each other and can be used at the same time. The choice is based primarily on the geometric constraint of the borehole and the constraint of the velocity anisotropy of the sample.

One of the most crucial problems is to generate and to receive uncontaminated signals of high signal-to-noise ratio in a borehole configuration. In a borehole configuration, the transmitting and receiving transducers must be on the same face. With the transducers directly pressed to the free surface of a sample, most of the energy is radiated outward, and little is transmitted directly from the transmitter to the receiver. This is particularly true for transversely polarized waves. Accordingly, a transducer wedge combination is used.

According to the invention, it is necessary to measure four velocities, $V_{z\theta}(0°)$, $V_{z\theta}(90°)$, $V_{zr}(0°)$ and $V_{zr}(90°)$, shown in FIG. 1, under a specific loading condition in order to determine the velocity anisotropy around the borehole where all relevant parameters can be measured without moving the transducers or cycling the stress. Four sets of transducers, two radially and two tangentially polarized, are needed and mounted in the principal stress directions on the wall of a borehole. Each set preferably includes a transmitter and two receivers although a single receiver in each set is sufficient.

One embodiment of apparatus according to the invention for generating and detecting shear waves in a borehole to determine stress induced velocity anisotropy is the ultrasonic stressmeter 10 shown in FIG. 2. Stressmeter 10 comprises ultrasonic stress probe 12 which is insertable into a borehole 14. In a preferred embodiment, the probe 12 comprises an inflatable urethane bladder 16.

Four sets of transducers 18, 20, 22 (not shown), and 24 are mounted in and project from probe 12; preferably each set includes three transducers a, b, c. The four sets of transducers are mounted at 90° intervals around the probe 12, and the three transducers 18a, b, c, etc. of each set are held in an aligned relationship and separated by a fixed distance along the length of probe 12. The inflatable bladder 14 is inflated by means of pump 26 which presses the transducers outward against the borehole wall with equal force and applies a constant selected pressure on the borehole 14 from inside the borehole.

The transducer pairs each comprise an acoustic transmitter and two acoustic receivers (e.g., manufactured by Precision Acoustic Devices, Inc.) which generate and detect shear waves. Two adjacent sets of transducers are radially polarized and measure the velocity $V_{zr}$ at the two angles $\theta = 0°$ and $90°$. The other two adjacent sets of tranducers are tangentially polarized and measure the velocity $V_{z\theta}$ at the two angles $\theta = 0°$ and $90°$. The transducers are ceramic piezoelectric crystals whose polarization is determined by the way the crystals are cut. A transducer may be used as either a transmitter or receiver. The transducer sets must be mounted in the principal stress directions on the wall of the borehole. Accordingly, in operation, initial measurements at different $\theta$ are taken to determine the stress orientation. This is done by plotting the travel time as a function of $\theta$. The maximum and minimum $\theta$ values are assumed to be the principal stress directions. The stressmeter is then repositioned before final data is collected.

The details of a transducer are shown in FIG. 3. A transducer 28 comprises a hollow body 30, typically cylindrical in shape although cubes or other shapes are also acceptable. A wedge 32 is mounted on the top surface inside the body 30 and a piezoelectric crystal 34 is mounted on the wedge 32.

Figure 4A:
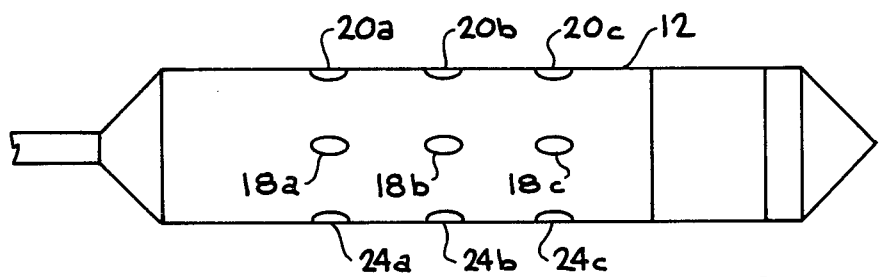
FIGS. 4A and B are illustrations of alternate embodiments the stressmeter showing alternate positions for the sets of transducers.
Figure 4B:
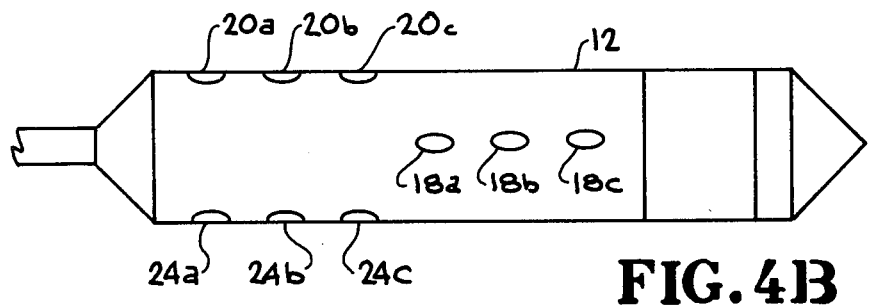

In operation, utilizing the stressmeter 10 shown in FIG. 2, one transducer in each set, e.g., 18a or c, is utilized as a transmitter. The two other adjacent transducers are used as receivers for timing (and velocity) measurements. To avoid cross signals between sets of receivers, the stressmeter 10 scans through the transducer sets, i.e., only one set is needed at a time. The use of a second receiver aligned with and spaced apart by a fixed distance from the first receiver allows a determination of absolute velocity. By cross-correlation of the two receiver signals an accurate measure of the transit time between the two receivers is obtained giving a good measure of the velocity. This is an improvement over the use of a single receiver since it is difficult to get an accurate measure of the transit time from a transmitter to a single receiver. Two alternate embodiments of the two receiver configurations are illustrated in FIGS. 4A and B. In the alternating configuration of FIG. 2A, the three transducers 18 a, b, c of one set are positioned alternately with the three transducers 20 a, b, c and 24 a, b, c of the two adjacent sets. In the parallel configuration of FIG. 4A the corresponding a, b, c transducers of each set are aligned. In the linear configuration of FIG. 4B, the three transducers 18 a, b, c of one set are all to one side of the three transducers 20 a, b, c and 24 a, b, c of the two adjacent sets.

The invention utilizes a dual approach to time measurement, as illustrated in FIG. 2. The pulsed phase-locked loop technique ($P^2L^2$) is used to measure the stress effect on travel time, and the "pure mode" waveform is digitized for later analyses.

The $P^2L^2$ technique employs a pulsed phase-locked loop interferometer 36, e.g., manufactured by Micro Ultrasonics, Inc. The interferometer tracks phase changes in the signal transmitted along the borehole by shifting the input frequency. Frequency is measured by counter 38. Changes in the oscillator frequency are thus proportional to the travel time changes. Because frequency can be measured precisely, the $P^2L^2$ technique is sensitive. The transducers are arranged in such a way that the displacement direction is always either parallel or perpendicular to the principal stress. This configuration guarantees that "pure modes" are generated under stress.

As shown in FIG. 2, the ultrasonic interferometer 36 is electrically connected to the transducers of probe 12 and applies an ultrasonic tone burst of a specific frequency to each transmitter transducer (in sequence as the sets are scanned). Receiver transducer convert the acoustic signal to an electronic signal which is received by the interferometer 36. The frequency required to maintain a constant phase relationship between the electrical signal to the transmitter and the acoustic signal received by the transducers is monitored by frequency counter 38. The receiver signals are also input to programmable digitizer 40 which stores the waveform data in a computer 42, e.g., a LSI-II.

The stressmeter 10 is used to measure velocity change due to stress. The acoustic phase shift from transmitter to receiver is $\phi = 2\pi\ ft = 2\pi\ fl/V$ where f is the operating frequency, t is the transit time, V is the sound velocity and l is the distance between the tranducers. When the loop is closed, $\alpha f/f = -\Delta t/t = \Delta V/V - \Delta l/l$.

Since the change in distance is negligible, the change in velocity is proportional to the change in frequency.

In operation, once the probe 12 has been correctly positioned, the bladder 16 is inflated by pump 26 in a series of increments to the full pressure, e.g., 2000–4000 psi. At each increment, a measurement is taken, and from this data the constants A and B in Equation (6) can be determined.

Data files taken at different stress levels are compared by cross-correlation methods to determine relative time changes. In this way, both $\Delta f$ and $\Delta t$ are measured by two independent methods for the same signal under the same stress condition. This redundancy provides an additional way to cross check the data.

The approach used for data analysis is the standard cross correlation of two time series.

Changes and modifications in the specifically described embodiments can be carried out without departing from the scope of the invention which is intended to be limited only by the scope of the appended claims.

I claim:

1. A method for determining stress around a borehole, comprising:
    generating a radially polarized shear wave in the borehole at two positions spaced apart by 90°;
    transmitting the radially polarized shear waves in a direction along the borehole;
    measuring the velocity of the radially polarized shear waves;
    generating a tangentially polarized shear wave in the borehole at two positions spaced apart by 90°;
    transmitting the tangentially polarized shear waves in a direction along the borehole;
    measuring the velocity of the tangentially polarized shear waves;
    calculating the stress induced shear wave velocity anisotropy from the measured velocities; and
    calculating the stress from the shear wave velocity anisotropy according to a predetermined relationship.

2. The method of claim 1 wherein the radially and tangentially polarized shear waves are generated by transmitting an acoustic signal from a first transducer, and the velocities are measured by receiving the transmitted signals at a spaced apart second transducer.

3. The method of claim 2 wherein the velocity is measured by measuring the transit time between the first and second transducers.

4. The method of claim 2 wherein the velocity is measured by measuring the phase change of the signal transmitted from the first to the second tranducer.

5. The method of claim 4 wherein the phase change is measured by shifting the frequency of the signal transmitted by the first transducer.

6. Apparatus for determining stress around a borehole, comprising:
    an inflatable bladder which is insertable in a borehole;

four sets of transducers each set being oriented along the borehole, each set including a transmitting transducer and at least one receiving transducer, the transducers being mounted in and projecting from the bladder in an aligned spaced apart relationship to contact the borehole wall, each set of transducers being spaced 90° from adjacent sets of transducers, two adjacent sets of transducers being radially polarized, the other two sets of transducers being tangentially polarized; and measuring means connected to the transducers for measuring the velocity of shear waves transmitted from the transmitting transducers to the receiving transducers.

7. The apparatus of claim 6 wherein the measuring means comprise means to measure the travel time between the transmitting and receiving transducers.

8. The apparatus of claim 6 wherein each set of transducers includes two receiving transducers.

* * * * *